US010430131B2

(12) United States Patent
Fukushima

(10) Patent No.: US 10,430,131 B2
(45) Date of Patent: Oct. 1, 2019

(54) IMAGE FORMING APPARATUS, IMAGE FORMING SYSTEM, AND IMAGE FORMING METHOD THAT ENABLES DIRECT CONNECTION EASILY

(71) Applicant: KYOCERA Document Solutions Inc., Osaka (JP)

(72) Inventor: Keisuke Fukushima, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/849,173

(22) Filed: Dec. 20, 2017

(65) Prior Publication Data

US 2019/0187944 A1 Jun. 20, 2019

(51) Int. Cl.
| | |
|---|---|
| G06F 3/12 | (2006.01) |
| H04L 9/08 | (2006.01) |
| H04L 29/06 | (2006.01) |
| H04W 76/14 | (2018.01) |
| H04W 4/80 | (2018.01) |
| H04B 5/00 | (2006.01) |

(52) U.S. Cl.
CPC .......... *G06F 3/1236* (2013.01); *G06F 3/1204* (2013.01); *G06F 3/1292* (2013.01); *H04B 5/0031* (2013.01); *H04L 9/0863* (2013.01); *H04L 9/0866* (2013.01); *H04L 63/0861* (2013.01); *H04W 4/80* (2018.02); *H04W 76/14* (2018.02); *G06F 3/1284* (2013.01); *H04N 2201/006* (2013.01)

(58) Field of Classification Search
CPC .................................................... G06F 3/1292
See application file for complete search history.

(56) References Cited

U.S. PATENT DOCUMENTS

| | | | | |
|---|---|---|---|---|
| 9,483,223 | B2 * | 11/2016 | Park | G06F 3/1296 |
| 9,781,299 | B2 * | 10/2017 | Suzuki | H04N 1/00912 |
| 9,933,983 | B2 * | 4/2018 | Suzuki | G06F 3/1292 |
| 2012/0300246 | A1 * | 11/2012 | Vidal | G07F 17/42 |
| | | | | 358/1.14 |
| 2013/0258390 | A1 * | 10/2013 | Suzuki | H04N 1/00912 |
| | | | | 358/1.14 |
| 2014/0136419 | A1 * | 5/2014 | Kiyohara | G06Q 20/3221 |
| | | | | 705/67 |
| 2014/0240773 | A1 * | 8/2014 | Suzuki | H04N 1/32773 |
| | | | | 358/1.15 |

(Continued)

*Primary Examiner* — Nicholas Pachol
(74) *Attorney, Agent, or Firm* — Hawaii Patent Services; Nathaniel K. Fedde; Kenton N. Fedde

(57) ABSTRACT

Provided is an image forming apparatus that can establish secure wireless direct connection with a terminal. A connection information transmitting part transmits the connection information of wireless direct connection to a terminal by short-range wireless connection. A password generating part, by using connection information transmitted by the connection information transmitting part, generates a password and transmits to the terminal in which the wireless direct connection has been established. A connection determining part continues connection with the terminal when the password transmitted by the password generating part is inputted on a self-apparatus and disconnects connection with the terminal when the password is not inputted on the self-apparatus.

8 Claims, 9 Drawing Sheets

(56) References Cited

U.S. PATENT DOCUMENTS

| | | | |
|---|---|---|---|
| 2014/0240774 A1* | 8/2014 | Suzuki | G06F 3/1236 358/1.15 |
| 2014/0240776 A1* | 8/2014 | Suzuki | G06F 3/1296 358/1.15 |
| 2015/0081845 A1* | 3/2015 | Arai | G06F 3/1204 709/218 |
| 2015/0092233 A1* | 4/2015 | Park | G06F 3/1288 358/1.15 |
| 2015/0092601 A1* | 4/2015 | Ando | H04W 76/10 370/254 |
| 2015/0193183 A1* | 7/2015 | Ichikawa | G06F 3/1292 358/1.15 |
| 2015/0248265 A1 | 9/2015 | Kang et al. | |
| 2016/0034237 A1* | 2/2016 | Kojima | G06F 3/1205 358/1.15 |
| 2016/0182762 A1* | 6/2016 | Eum | H04N 1/4413 358/1.14 |
| 2016/0295037 A1* | 10/2016 | Kawai | H04N 1/00204 |
| 2016/0301681 A1* | 10/2016 | Nakazato | H04L 63/083 |
| 2017/0041977 A1* | 2/2017 | Yokoyama | H04L 63/083 |
| 2017/0208431 A1* | 7/2017 | Suzuki | H04W 76/10 |
| 2017/0237870 A1* | 8/2017 | Kojima | H04N 1/00307 358/1.15 |
| 2017/0302659 A1* | 10/2017 | Shteingart | H04L 63/0853 |
| 2017/0366702 A1* | 12/2017 | Suzuki | H04N 1/00912 |
| 2018/0015755 A1* | 1/2018 | Yamada | G06F 3/1236 |
| 2018/0024792 A1* | 1/2018 | Kubota | H04L 67/141 358/1.15 |
| 2018/0067707 A1* | 3/2018 | Fukushima | H04L 63/0846 |
| 2019/0050178 A1* | 2/2019 | Kook | H04L 63/083 |

* cited by examiner

US 10,430,131 B2

IMAGE FORMING APPARATUS, IMAGE FORMING SYSTEM, AND IMAGE FORMING METHOD THAT ENABLES DIRECT CONNECTION EASILY

BACKGROUND

The present disclosure relates to an image forming apparatus, an image forming system, and an image forming method, and is particularly-related to the image forming apparatus, the image forming system, and the image forming method, which direct connection is possible, easily.

An image forming apparatus, such as an MFP (Multi-functional Peripheral) or a printer that can print a document and an image, are present.

In a typical technology, an image forming apparatus connectable with a portable terminal are disclosed. For example, a registry request for an event that should be notified to the portable terminal when it occurs in an image forming apparatus is received from the portable terminal. Whereupon, registration about the event is performed according to the received registry request. Then, the WiFi-Direct connection (wireless direct connection) with the specific portable terminal is disconnected. In this case, an image forming apparatus specifies the event where the respective specific portable terminal is registered as a communication destination in the registered events. Then, an image forming apparatus cancels the registration about the specified event. As configured in this way, the registration about the event notification to the communication device is prevented from continuously-remaining in an image forming apparatus.

SUMMARY

An image forming apparatus of the present disclosure is provided with a connection information transmitting part, a password generating part, and a connection determining part. The connection information transmitting part transmits connection information of wireless direct connection to a terminal by short-range wireless connection. The password generating part generates a password and transmits it to the terminal. In this case, with the terminal, the wireless direct connection has been established by the connection information transmitted by the connection information transmitting part. The connection determining part continues connection between a self-apparatus and the terminal when the password transmitted by the password generating part is inputted on the self-apparatus. Also, the connection determining part disconnects connection between the self-apparatus and the terminal when the password is not inputted on the self-apparatus.

An image forming system of the present disclosure is an image forming system having a terminal and an image forming apparatus that can be printed from the terminal. The terminal is provided with a connection information acquiring part, a direct connection part, and a password acquiring part. The connection information acquiring part connects by short-range wireless connection between a self-apparatus and the image forming apparatus and receives connection information of wireless direct connection. The direct connection part performs the wireless direct connection between the self-apparatus and the image forming apparatus by the connection information acquired by the connection information acquiring part. The password acquiring part receives and shows a password when the wireless direct connection has been established by the direct connection part. The image forming apparatus of the present disclosure is provided with a connection information transmitting part, a password generating part, and a connection determining part. The connection information transmitting part transmits connection information of wireless direct connection to a terminal by short-range wireless connection. The password generating part generates a password and transmits it to the terminal. In this case, with the terminal, the wireless direct connection has been established by the connection information transmitted by the connection information transmitting part. The connection determining part continues connection between a self-apparatus and the terminal when the password transmitted by the password generating part is inputted on the self-apparatus. Also, the connection determining part disconnects connection between the self-apparatus and the terminal when the password is not inputted on the self-apparatus.

An image forming method of the present disclosure is an image forming method executed by an image forming apparatus. The image forming apparatus transmits the connection information of wireless direct connection to the terminal by short-range wireless connection. The image forming apparatus generates a password in which the wireless direct connection has been established by the transmitted connection information and transmits it to the terminal. The image forming apparatus continues connection with the terminal when the transmitted password is inputted on a self-apparatus. Also, the image forming apparatus disconnects connection with the terminal when the password is not inputted on the self-apparatus.

DETAILED DESCRIPTION

First Embodiment

[System Configuration of Image Forming System X]

Figure 1:
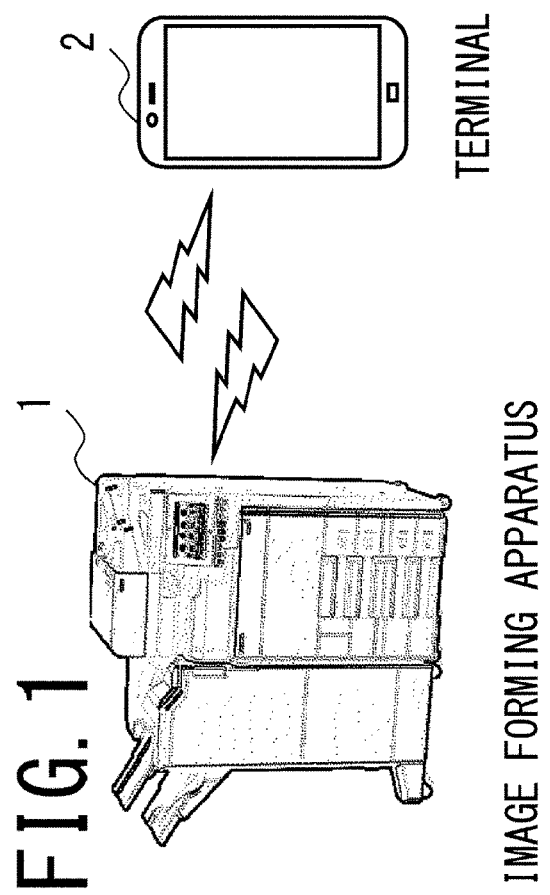
FIG. 1 is a system configuration figure of the image forming system according to a first embodiment in the present disclosure.

First, as refer to FIG. 1, an overall system configuration of the image forming system X according to a first embodiment of the present disclosure is described. Image forming system X includes image forming apparatus 1 and terminal 2. Image forming apparatus 1 is connected with terminal 2 for a user and performs printing, or the like.

Image forming apparatus 1 is an MFP, a printer having a simple printing function, or the like, and is provided with the wireless connection function. Image forming apparatus 1 may be installed in a university, a co-op, a convenience store, or the like. Also, image forming apparatus 1 is performed wireless connection and is printed by a user, such as a common visitor to a store, or the like. In this case, network printing by using a server, or the like, on a so-called "cloud" may be performed. Also, it is also possible to print a file of the electronic filing document or photograph that are stored in image forming apparatus 1 or to scan with converting a manuscript of paper(s) into an electronic document. Also, image forming apparatus 1 may be possibly installing such purpose-oriented application software for exclusive use (hereinafter, it is just called as an "application."). Also, in the following, the application for image forming apparatus 1 is called to an "apparatus application."

Terminal 2 is mobile terminal for a user provided with a wireless connection function. Terminal 2 may also be connected with image forming apparatus 1, and the application for exclusive use for performing printing, or the like, may be installed. Also, in the following, an application for terminal 2 is called "terminal application."

In the present embodiment, image forming apparatus 1 and terminal 2 are connected with a wireless connection. Also, in the present embodiment, the apparatus application and the terminal application cooperate to establish a wireless connection, and a secure wireless connection can be generated.

Figure 2:
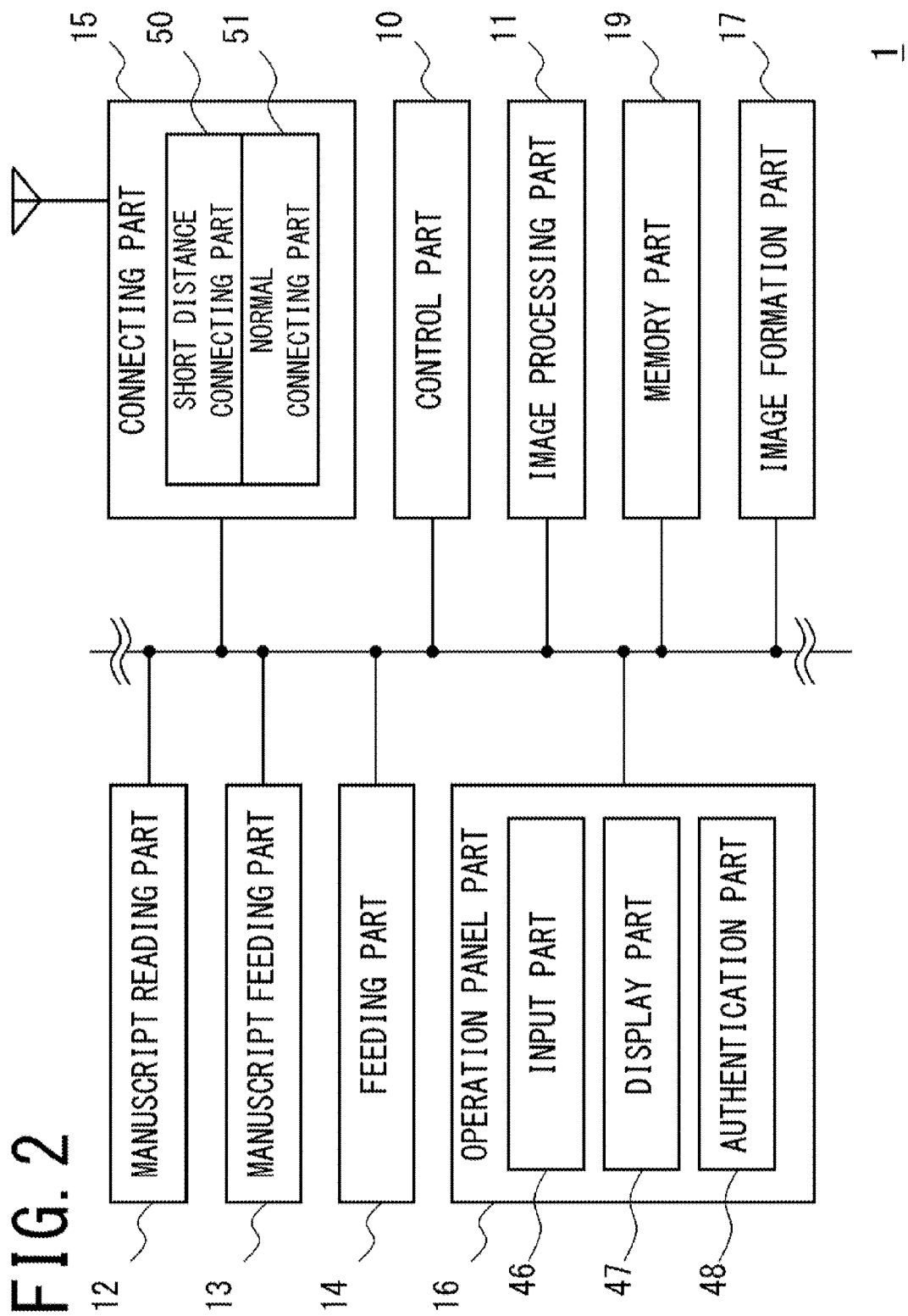
FIG. 2 is a block diagram showing the control configuration of the image forming apparatus as shown in FIG. 1.

Then, as refer to FIG. 2, a control configuration of image forming apparatus 1 is described. Image forming apparatus 1 includes image processing part 11, manuscript reading part 12, manuscript feeding part 13, feeding part 14, connecting part 15, operation panel part 16, image formation part 17, and memory part 19, or the like. Each part is connected to control part 10 and its operation is controlled by control part 10.

Control part 10 is an information processing part, such as CPU (Central Processing Unit). Control part 10 reads the control program stored in memory part 19 and executes the control program to be operated as each part of the functional block as described later. Also, control part 10 controls a whole device corresponding to the specified instructions information inputted from terminal 2 or operation panel part 16.

Image processing part 11 is an information processing part specified for image processing. Image processing part 11 performs the specified image processing for image data. For example, image processing part 11 performs various image processing, such as scaling, density control, gradation adjustment, image improvement, or the like. Image processing part 11 stores the image read by manuscript reading part 12 as print data to memory part 19.

Manuscript reading part 12 reads a set manuscript. Also, manuscript reading part 12 is arranged on an upper part of the body part of image forming apparatus 1. Manuscript reading part 12 is provided with a scanner, platen glass, and a manuscript reading slit. Manuscript reading part 12 moves the scanner to the position that faces the platen glass when reading the manuscript placed on platen glass. Then, manuscript reading part 12 is read scanning the manuscript placed on platen glass and obtains image data. Manuscript reading part 12 outputs the obtained image data to control part 10.

Also, when reading the manuscript fed from manuscript feeding part 13, manuscript reading part 12 moves the scanner to a position that faces the manuscript reading slit. Then, manuscript reading part 12 reads the manuscript via the manuscript reading slit synchronizing with the conveying action of the manuscript by manuscript feeding part 13 and obtains image data. Manuscript reading part 12 outputs the obtained image data to control part 10.

Manuscript feeding part 13 conveys the manuscript read by manuscript reading part 12. Manuscript feeding part 13 is arranged on the upper part of manuscript reading part 12. Manuscript feeding part 13 is provided with the manuscript mounting part and the manuscript transport mechanism. Manuscript feeding part 13 feeds out manuscript placed on the manuscript mounting part one sheet at a time by a manuscript transport mechanism. Then, manuscript feeding part 13 feeds the fed-out manuscript to manuscript reading part 12.

Feeding part 14 feeds out a recording paper one sheet at a time to image formation part 17. Feeding part 14 is provided within a body part.

Connecting part 15 is a connecting unit that performs wireless connection, or the like, with terminal 2. Connecting part 15 includes short distance connecting part 50 and normal connecting part 51.

Short distance connecting part 50 is a circuit for performing connection with comparatively short-distance wireless connection (Hereinafter, it is called "short-range wireless connection"), such as Bluetooth® LE, iBeacon®, NFC (Near Field Radio Communication), or the like. Short distance connecting part 50 can send connection information 300 (FIG. 4) required in order to perform wireless direct connection by wireless LAN (Radio Local Area Network), such as various standards of IEEE-802.11 and WiFi® by normal connecting part 51. Normal connecting part 51 is a circuit for performing long-distance wireless connection rather than short distance connecting part 50, or the like. In the present embodiment, normal connecting part 51 performs wireless connection by WiFi, or the like. In this case, normal connecting part 51 may perform wireless direct connection, such as WiFi-Direct, or the like. Also, normal connecting part 51 can perform the secure wireless communications encrypted in the WPA2, or the like, in the wireless direct connection. Connecting part 15 may include a LAN board, a wireless transmitter and receiver, or the like, for connecting with external networks, such as LAN, WAN, a mobile phone network, or the like. Also, connecting part 15 transmits and receives data by the line for data communications and transmits and receives an audio signal by a voice call line.

Operation panel part 16 is provided with input part 46, display part 47, and authentication part 48. Also, operation panel part 16 is arranged on front-side of image forming apparatus 1.

Input part 46 includes buttons, a touch panel, or the like. The buttons are a numeric keypad, a start, a cancel, switching of operational mode, performing instruction to executing of a job, or the like. Operational mode may include the type of a copy, a FAX transmission, a scanner, a network scanner, or the like. Also, job may include types, such as print, transmission, storage, record for selected document, or the like. Also, input part 46 can input one-time password as described later. Also, input part 46 acquires instructions of the various jobs of image forming apparatus 1 by a user. Also, input part 46 can also input and change each user information according to an instruction by a user. Also, input part 46 may include NFC transmission and reception part including an antenna, a drive circuit, or the like, to transmit and receive information to terminal 2 by NFC.

Display part 47 is a dot-matrix display, or the like, which display a variety of information. In the present embodiment, the display screen for inputting the one-time password described later is displayed on display part 47.

Figure 4:
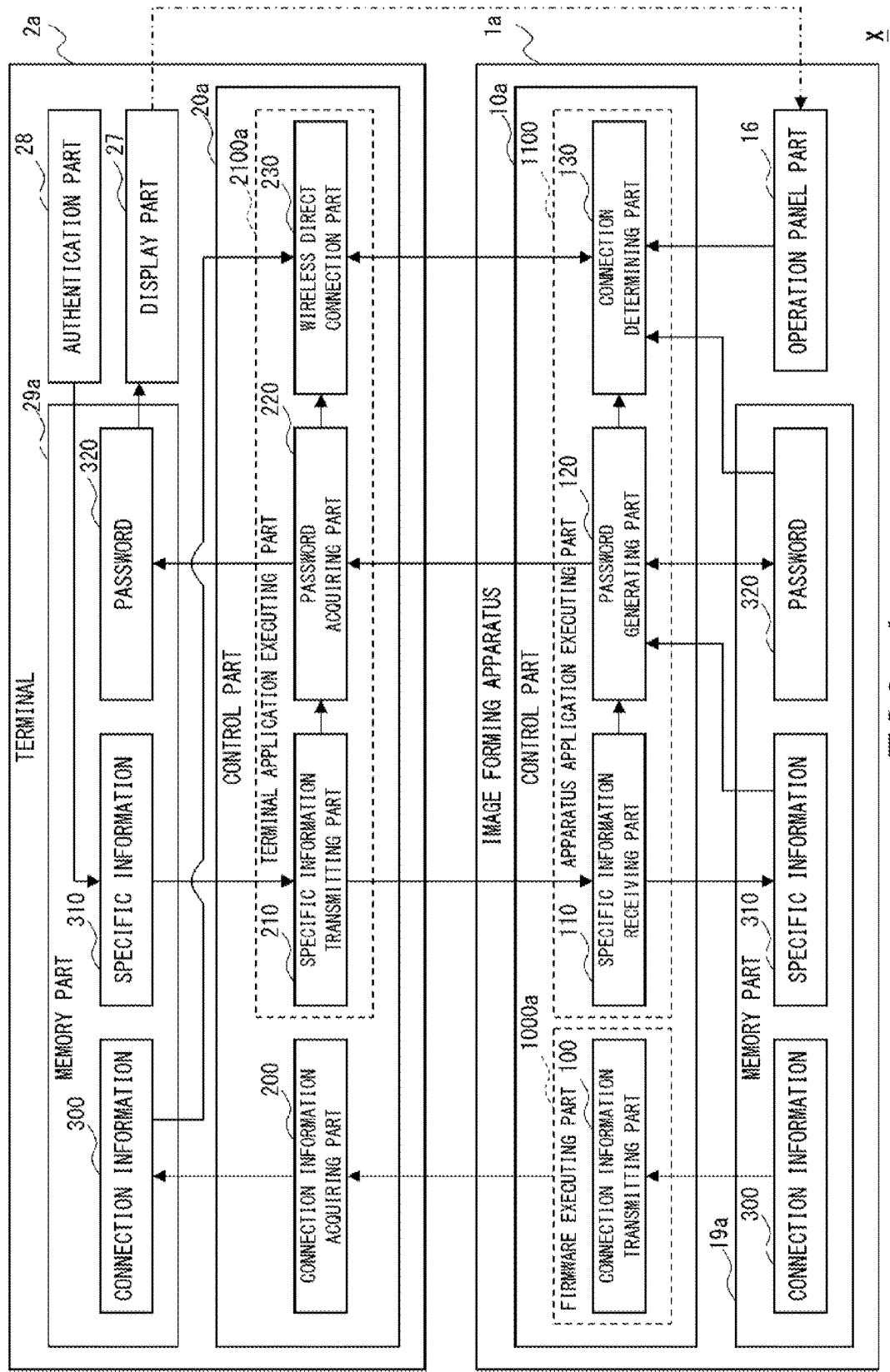
FIG. 4 is a block diagram showing the functional configuration of the image forming system according to the first embodiment of the present disclosure.

Authentication part 48 is a device that performs biometric authentication. For example, authentication part 48 can perform a user's fingerprint authentication, vein authentication, voice authentication, face authentication, or the like. Thereby, authentication part 48 can authenticate whether the user of terminal 2 is the person himself or herself. Authentication part 48 outputs an authentication result as biometric authentication information (FIG. 4). In addition, for example, authentication part 48 may unite with a button or may be provided in the front panel.

Image formation part 17 makes a recording paper perform an image formation from the data stored in memory part 19, read by manuscript reading part 12, or acquired from terminal 2 by an output instruction by a user. Image formation part 17 is provided with a photo conductor drum, an exposure part, a developing part, a transfer part, a fixing part, or the like. Image formation part 17 records a toner image on a recording paper by performing an image formation process having electrification, exposure, development, transfer, and fixing.

Memory part 19 is a non-transitory recording medium. Memory part 19 stores a control program for controlling the operation of image forming apparatus 1. The control program includes programs and data for firmware, OS, various applications, or the like. Also, in the present embodiment, the apparatus application is included in the various applications. In addition, the control program includes a middleware being worked on OS, a device driver controlling image forming apparatus 1 according to instructions, or the like. In addition, memory part 19 also stores account settings for a user. Also, the area of the document box (storage folder) for each user may be included in memory part 19.

In image forming apparatus 1, control part 10 and image processing part 11 may be integrally-formed as like CPU with built-in GPU, or the like, and a chip-on module package. Also, control part 10 and image processing part 11 may contain RAM, ROM, a flash memory, or the like. Also, image forming apparatus 1 may be provided with a FAX transmission and reception part that transmits and receives a facsimile.

Figure 3:
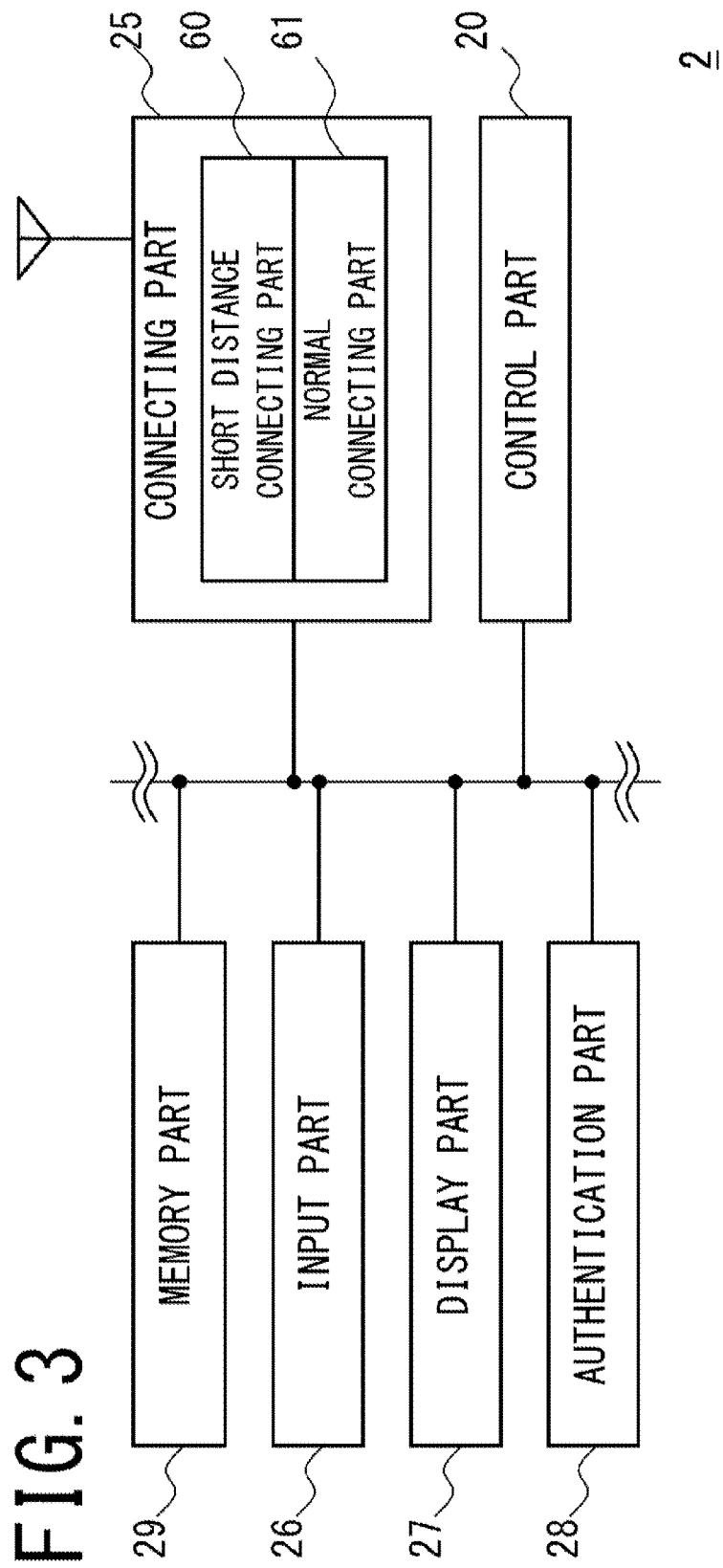
FIG. 3 is a block diagram showing the control configuration of the terminal as shown in FIG. 1.

Then, as refer to FIG. 3, a control configuration of terminal 2 in the present embodiment is described. Terminal 2 includes control part 20, connecting part 25, input part 26, display part 27, and authentication part 28. Each part is connected to control part 20, and its operation is controlled by control part 20.

Control part 20 is an information processing part, such as CPU.

Connecting part 25 is a connecting part that performs wireless connection, or the like, to image forming apparatus 1. Connecting part 25 includes short distance connecting part 60 and normal connecting part 61.

Short distance connecting part 60 is a circuit for performing connection of short-range wireless connection with short distance connecting part 50 in image forming apparatus 1, or the like. Short distance connecting part 60 is ability for receiving connection information 300 (FIG. 4) for performing wireless direct connection by normal connecting part 51.

Normal connecting part 61 is a circuit for performing wireless connection with normal connecting part 51 of image forming apparatus 1, or the like.

Input part 26 acquires the various instructions by a user. Input part 26 is a pointing device, various sensors, a button, or the like. The pointing device includes a touch panel, a digitizer, a touchpad, or the like. Also, it is possible to perform various settings, or the like, for a terminal application or to instruct printing, or the like, by an instruction inputted by a user with input part 26.

Display part 27 is a kind of dot-matrix display. Display part 27 can display a various operation screens associating with GUI (Graphical User Interface). Input part 26 and display part 27 can acquire various instructions inputted by a user by using GUI on OS. In addition, input part 26 and display part 27 may be integrally formed as like the display with a touch panel or a digitizer.

Authentication part 28 is a device to perform biometric authentication. Authentication part 28 may perform fingerprint authentication, vein authentication and voice authentication, face authentication, or the like, for a user. Also, authentication part 28 may output the biometric authentication information (FIG. 4) that is a result of the biometric authentication. In addition, authentication part 28 may be a similar type device as like authentication part 48 in image forming apparatus 1. That means, the biometric authentication information acquired by authentication part 28 may be similar to biometric authentication information acquired by authentication part 48 in image forming apparatus 1.

Memory part 29 is a non-transitory recording medium. Also, memory part 29 may include external storages, such as various flash memories and an optical recording medium. Also, a control program for controlling operation of terminal 2 is stored in memory part 29. The control program also includes the program and data for OS and the terminal application. In addition, memory part 29 may store a user account setting, a storage folder, or the like.

In addition, control parts 10, 20 may integrate a non-transitory recording medium. Also, control parts 10, 20 read the control programs stored in memory parts 19, 29, and they expand and execute the control programs, respectively. Thereby, they are operated as each part of the functional block as described below.

[Functional Configuration of Image Forming System X]

Here, as refer to FIG. 4, a functional configuration of image forming system X is described. Control part 10*a* of image forming apparatus 1*a* includes connection information transmitting part 100, specific information receiving part 110, password generating part 120, and connection determining part 130. In the present embodiment, connection information transmitting part 100 is configured by firmware executing part 1000*a* that executes the firmware stored in memory part 19*a*. Also, specific information receiving part 110, password generating part 120, and connection determining part 130 are configured by apparatus application executing part 1100 that executes the apparatus application stored in memory part 19*a*. Also, memory part 19*a* stores connection information 300, specific information 310, and password 320. Also, control part 20*a* of terminal 2*a* includes connection information acquiring part 200, specific information transmitting part 210, password acquiring part 220, and wireless direct connection part 230. In the present embodiment, wireless direct connection part 230 and password acquiring part 220 are configured by terminal application executing part 2100*a* that executes the terminal application stored in memory part 29*a*. Also, connection information acquiring part 200 may be implemented as a function of OS by executing OS. Also, memory part 29*a* stores connection information 300, specific information 310, and password 320.

Connection information transmitting part 100 transmits connection information 300 of wireless direct connection to terminal 2*a* by short-range wireless connection.

Specific information receiving part 110 receives specific information 310 from terminal 2*a* and stores it in memory part 19*a*.

Password generating part 120 generates password 320 for transmitting to terminal 2*a*. In this case, to terminal 2*a*, wireless direct connection is established by using connection information 300 transmitted by connection information transmitting part 100. Also, password generating part 120 may generate password 320 as a one-time password. Also, password generating part 120 may generate password 320 as a password based on specific information 310. Also, when the specific information 310 is biometric authentication information obtained from terminal 2*a*, password generating part 120 may generate password 320 corresponding to the biometric authentication information. Also, password generating part 120 transmits generated password 320 to terminal 2*a*.

Connection determining part 130 continues connection with terminal 2*a* when password 320 transmitted by password generating part 120 is inputted in a self-apparatus. Also, connection determining part 130 disconnects connection with terminal 2*a* when password 320 is not inputted in the self-apparatus. Also, connection determining part 130 may determine by using password 320 based on the biometric authentication information obtained from terminal 2*a* as specific information 310. In this case, connection determining part 130 may determine to be inputted or not by comparing the biometric authentication information acquired by authentication part 48 in the self-apparatus and the respective password 320.

Connection information acquiring part 200 connects by short-range wireless connection with image forming apparatus 1*a* and receives connection information 300 of wireless direct connection.

Specific information transmitting part 210 transmits specific information 310, which is unique to the self-apparatus. Also, specific information transmitting part 210 may acquire biometric authentication information from authentication part when specific information 310 is to the biometric authentication information.

Password acquiring part 220, when wireless direct connection is established by wireless direct connection part 230, receives password 320 and shows display part 27, or the like.

Wireless direct connection part 230 performs wireless direct connection with image forming apparatus 1*a* by using connection information 300 acquired by connection information acquiring part 200. Also, wireless direct connection part 230 can cut connection with terminal 2*a* by instructions of connection determining part 130.

Connection information 300 is information for the connection for performing wireless direct connection with image forming apparatus 1*a*. Connection information 300 may be, for example, SSID of WiFi-Direct, or the like, and an encrypted password, or the like. The encryption may correspond to a various encryption for WiFi, such as WPA2, or the like.

Specific information 310 is identification data unique to terminal 2*a* and/or a user. Specific information 310 may be, for example, identification information, such as a serial number of terminal 2*a*, unique ID being unique, and an account name of a user, a user ID, or the like. Also, specific information 310 may be encrypted by public key, a hash function, or the like. Also, specific information 310 may be biometric authentication information, or the like, acquired by authentication part 28 in terminal 2*a*.

Password 320 is certification information based on character(s), a number, or a sign that a user can input by operation panel part 16, biometric information, or the like. In the present embodiment, password 320 may be, for example, a character string, a numerical sequence, or the like, generated at random and, further, may be a one-time password being changed every time.

Here, control part 10 of image forming apparatus 1 executes the control program stored in memory part 19 and is functioned as connection information transmitting part 100, specific information receiving part 110, password generating part 120, and connection determining part 130. Also, control part 20 of terminal 2 executes the control program stored in memory part 29 and is functioned as connection information acquiring part 200, specific information transmitting part 210, password acquiring part 220, and wireless direct connection part 230. Also, each part of above-mentioned image forming apparatus 1 and terminal 2 serves as hardware resources that performs the image forming method in the present disclosure.

[Connection Establishment Process by Image Forming System X]

Figure 5:
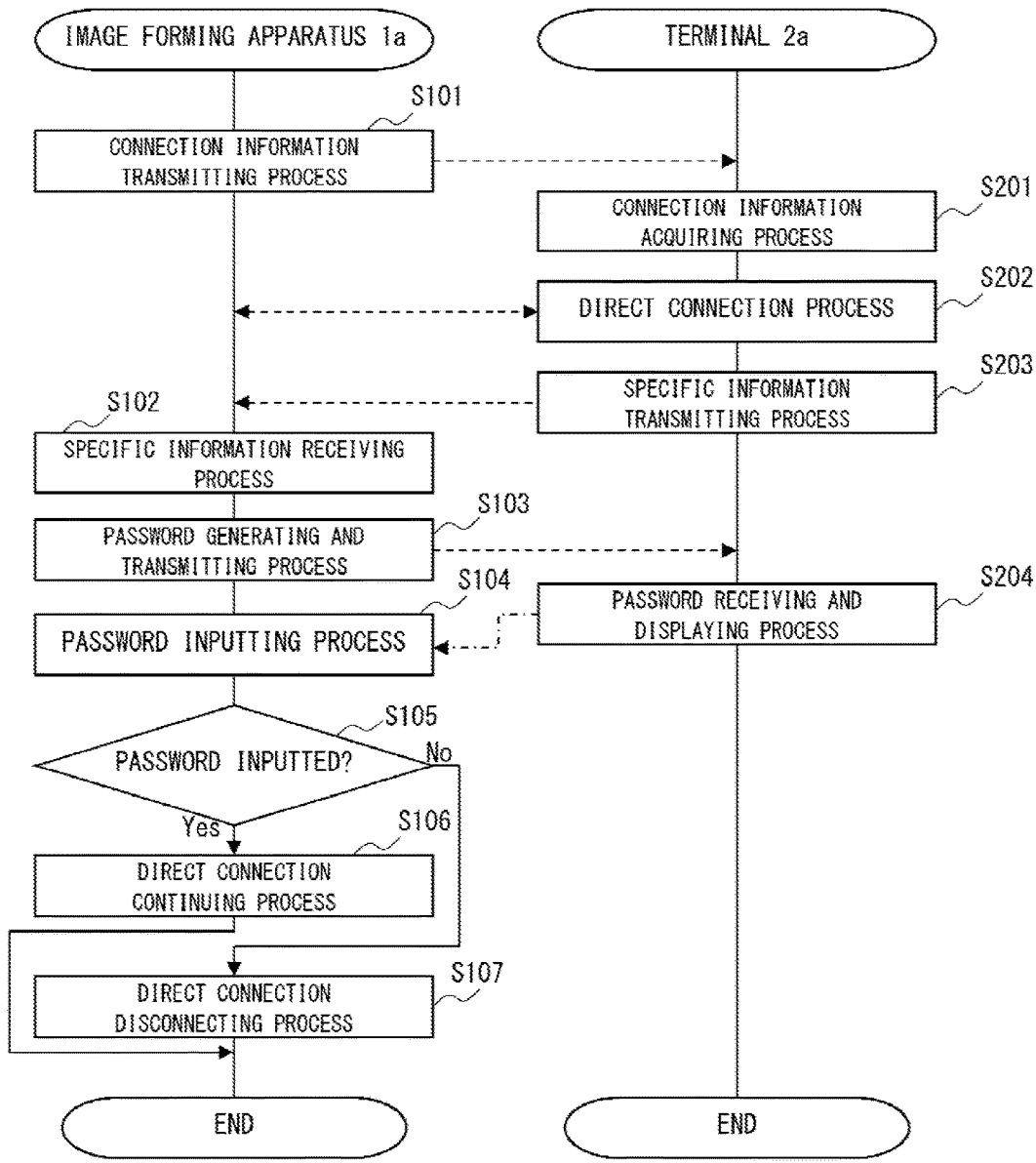
FIG. 5 is a flowchart of the connection establishment process according to the first embodiment of the present disclosure.
Figure 6:
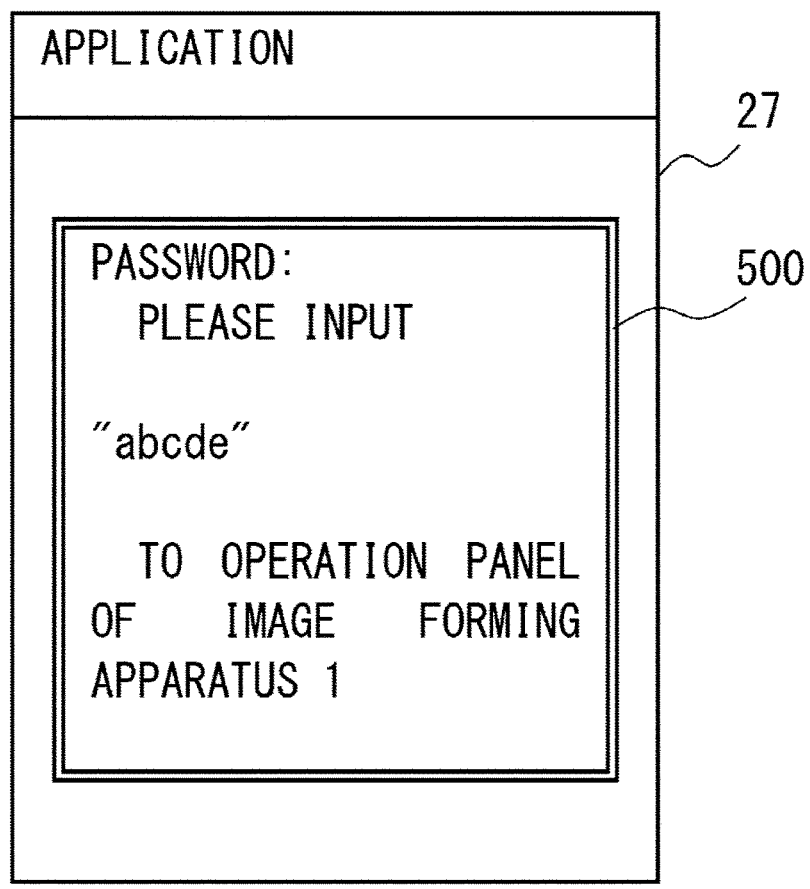
FIG. 6 shows a screen example of the terminal in the connection establishment process as shown in FIG. 5.
Figure 7:
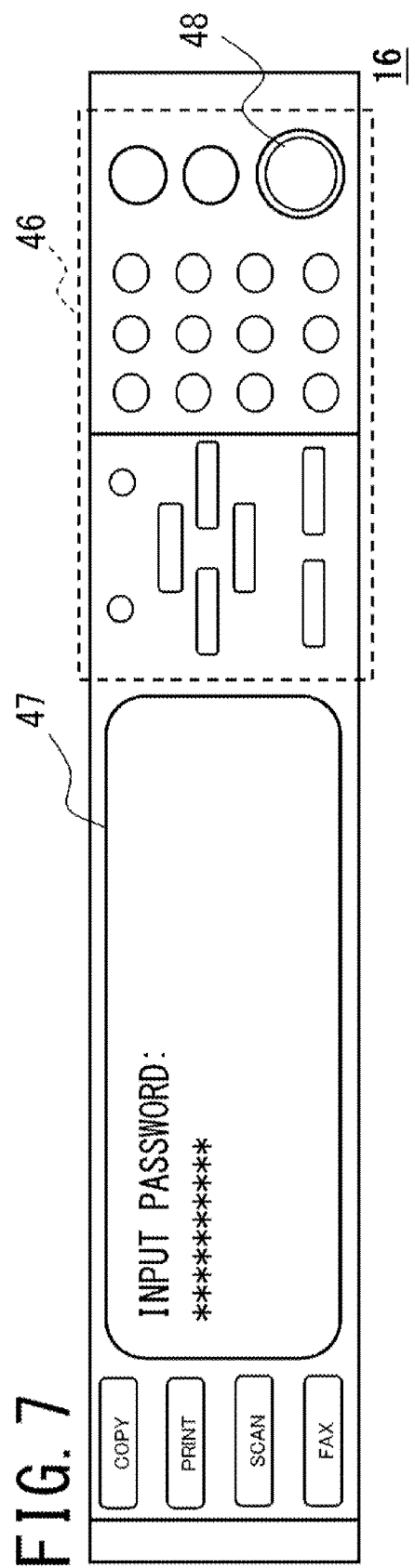
FIG. 7 shows the screen example of the image forming apparatus in the connection establishment process as shown in FIG. 5.

Then, as refer to FIG. 5-FIG. 7, a connection establishment process by image forming system X according to a first embodiment of the present disclosure is explained. In the connection establishment process of the present embodiment, connection information 300 of wireless direct connection is first transmitted to terminal 2*a* by short-range wireless connection from image forming apparatus 1*a*. Terminal 2*a* is connected by short-range wireless connection with image forming apparatus 1*a* and receives connection information 300 of wireless direct connection. Then, terminal 2*a* performs wireless direct connection with image forming apparatus 1*a* by acquired connection information 300. Image forming apparatus 1*a* generates and transmits password 320 to terminal 2*a* in which wireless direct connection has been established by transmitted connection information 300. Terminal 2*a* receives and shows password 320 when wireless direct connection is established. Image forming apparatus 1*a* continues connection with terminal 2*a* when transmitted password 320 is inputted, and it disconnects connection with terminal 2*a* when password 320 is not inputted. In the connection establishment process of the present embodiment, control parts 10*a* and 20*a* collaborate with each part, and mainly execute the program stored in memory parts 19*a* and 29*a* by using hardware resources, respectively. In the following, as refer to the flow chart of FIG. 5, the details of the connection establishment process in the present embodiment are explained for each step.

(Step S101)

Firstly, connection information transmitting part 100 of image forming apparatus 1*a* performs a connection information transmitting process. Connection information transmitting part 100 reads connection information 300 from memory part 19*a*, and transmits it to terminal 2*a* by short distance connecting part 50. In this case, connection information transmitting part 100 can send connection information 300 to terminal 2*a* up to approximate radius 5 m away from the self-apparatus by Bluetooth® LE and iBeacon®. Also, connection information transmitting part 100 may transmit connection information 300 when NFC communication is established with terminal 2*a*.

(Step S201)

Here, connection information acquiring part 200 in terminal 2*a* performs a connection information acquiring process. Connection information acquiring part 200 connects with image forming apparatus 1a by short-range wireless connection. Connection information acquiring part 200 receives connection information 300 of wireless direct connection and stores it in memory part 29a. In addition, in this case, connection information acquiring part 200 may start the terminal application stored in memory part 29a, and it may make control part 20a execute it.

(Step S202)

Then, wireless direct connection part 230 performs a wireless direct connection process. Wireless direct connection part 230 refers to connection information 300 in memory part 29a and establishes wireless direct connection with image forming apparatus 1a by normal connecting part 61. For example, wireless direct connection part 230 may connect with wireless direct connection part 230 in image forming apparatus 1a by using SSID and encrypted password in connection information 300.

(Step S203)

Then, specific information transmitting part 210 performs a specific information transmitting process. Specific information transmitting part 210 refers to specific information 310 in memory part 29a and transmits it to image forming apparatus 1a by normal connecting part 61. In this case, specific information transmitting part 210 may encrypt identification information and may transmit it to image forming apparatus 1a. Also, specific information transmitting part 210 obtains biometric authentication information by authentication part 28 as specific information 310 and may transmit it to image forming apparatus 1a.

(Step S102)

Here, specific information receiving part 110 of image forming apparatus 1a performs a specific information receiving process. Specific information receiving part 110 receives specific information 310 from terminal 2a and stores in memory part 19a.

(Step S103)

Then, password generating part 120 performs a password generating and transmitting process. Password generating part 120 generates password 320 and stores it in memory part 19a, temporarily. Password generating part 120 may generate password 320 as a random one-time password. Also, password generating part 120 may generate password 320 as a password based on specific information 310. In this case, when specific information 310 is encrypted, password generating part 120 may decrypt this with the secret key stored in memory part 19a and may generate password 320. Also, when this specific information 310 is biometric authentication information obtained by authentication part 28 in terminal 2a, password generating part 120 may generate password 320 corresponding to the biometric authentication information. When password 320 generated from such specific information 310 is generated, password generating part 120 converts obtained specific information 310 into a character string, a numerical sequence, or the like, by a hash function, or the like, and thus password 320 may be generated. Also, password generating part 120 transmits generated password 320 to terminal 2a via wireless direct connection.

(Step S204)

Here, password acquiring part 220 of terminal 2a performs password receiving and displaying process. Password acquiring part 220 receives password 320 by wireless direct connection and stores it in memory part 29b. According to the example screen of FIG. 6, password acquiring part 220 displays this stored password 320 on display part 27 as display column 500. Thereby, the one-time password is shown to the user. When password 320 is generated based on the biometric authentication information acquired by authentication part 28 in terminal 2a, password acquiring part 220 may only display on display part 27 as "Please perform biometric authentication with image forming apparatus 1a." Thereby, the process by terminal 2a in the connection establishment process in the present embodiment is ended. In addition, if wireless direct connection is not cut as described later, terminal 2a continues the wireless direct connection with image forming apparatus 1a by using connection information 300.

(Step S104)

Here, connection determining part 130 of image forming apparatus 1a performs a password inputting process. According to FIG. 7, connection determining part 130 displays the display screen of "Input password" on display part 47 in operation panel part 16 and acquires the input password that the user inputs by input part 46. In this case, a concealed indication of the acquired password 320 may be given as "*", or the like. In addition, connection determining part 130, if password 320 is generated based on the biometric authentication information obtained by authentication part 28 in terminal 2a, may perform authentication by using authentication part 48. That is, in image forming apparatus 1a, connection determining part 130 may acquire the input password, which is biometric authentication information for the user, again.

(Step S105)

Then, connection determining part 130 determines whether the right password is inputted or not. Connection determining part 130 acquires an input password from input part 46, and if this input password and password 320 are equivalent, it determines as Yes. That is, connection determining part 130 determines as Yes if password 320 shown at terminal 2a is correctly inputted on image forming apparatus 1. Also, connection determining part 130 determines as Yes also if biometric authentication information inputted by authentication part 48 corresponds with password 320 based on the biometric authentication information. Connection determining part 130 determines as No if other. In Yes, connection determining part 130 advances a process to Step S106. In No, connection determining part 130 advances a process to Step S107.

(Step S106)

If the right input password is inputted, connection determining part 130 performs wireless direct connection continuing process. Connection determining part 130 continues wireless direct connection with terminal 2a. Thereby, the connection establishment process according to the embodiment in the present disclosure is ended. In this case, it becomes possible to perform printing with image forming apparatus 1a, or the like, from a terminal application, or the like, by the user.

(Step S107)

If the right input password is not inputted, connection determining part 130 performs wireless direct connection disconnecting process. Connection determining part 130 instructs to normal connecting part 51 as disconnecting wireless direct connection with terminal 2a. In this case, connection determining part 130 may display "Right password is not inputted. Connection is interrupted", or the like, on display part 47 of operation panel part 16. Also, connection determining part 130 may perform an error display on display part 27 in terminal 2a. As the above-mentioned, the connection establishment process according to the embodiment in the present disclosure is ended.

The following effects can be obtained with configuration as mentioned above. In a typical technology, even after the wireless direct connection of WiFi-Direct, or the like, is cut, the connection information of wireless direct connection remained in the portable terminal. Therefore, in the case of except for outputting with an image forming apparatus with a portable terminal, it might be connected with the portable terminal. As a result, connection with another portable terminal desiring to connect cannot be performed, or there is a problem of security. On the other hand, image forming system X according to the embodiment in the present disclosure includes terminal 2a and image forming apparatus 1a that can be printed from terminal 2a. Terminal 2a is provided with connection information acquiring part 200, wireless direct connection part 230, and password acquiring part 220. Connection information acquiring part 200 connects with image forming apparatus 1a by short-range wireless connection and receives connection information 300 of wireless direct connection. Wireless direct connection part 230 performs wireless direct connection with image forming apparatus 1a by using connection information 300 acquired by connection information acquiring part 200. Password acquiring part 220 receives and shows password 320 when wireless direct connection is established by wireless direct connection part 230. Image forming apparatus 1a is provided with connection information transmitting part 100, password generating part 120, and connection determining part 130. Connection information transmitting part 100 transmits connection information 300 of wireless direct connection to terminal 2a by short-range wireless connection. Password generating part 120 generates and transmits password 320 to terminal 2a in which wireless direct connection has been established by using connection information 300 transmitted by connection information transmitting part 100. Connection determining part 130 continues connection with terminal 2a when password 320 transmitted by password generating part 120 is inputted, and it disconnects connection with terminal 2a when password 320 is not inputted. As configured in this way, only when required, image forming apparatus 1a certainly connectable with terminal 2a desiring to connect can be given. Also, the security at the time of connection can be raised.

Also, image forming system X related to the embodiment of the present disclosure is characterized by the following: in terminal 2a, wireless direct connection part 230 and password acquiring part 220 are configured that the terminal application, which is the application software for a self-apparatus, is executed by terminal application executing part 2100a of control part 20a in the self-apparatus. Also, in image forming apparatus 1a, connection information transmitting part 100 is configured that firmware of a self-apparatus is executed by firmware executing part 1000a of control part 10a in the self-apparatus. Further, password generating part 120 and connection determining part 130 are configured that an apparatus application for the self-apparatus installed other than the firmware of the self-apparatus is executed by apparatus application executing part 1100 of control part 10a. As configured in this way, even if it does not change the firmware of image forming apparatus 1a, it becomes possible to perform connection being raised security just by installing an apparatus application.

Also, as for image forming system X according to the embodiment in the present disclosure, password generating part 120 generates password 320 as a one-time password. As configured in this way, it becomes possible to perform connection being raised security just by inputting password 320 displayed on terminal 2a.

Also, as for image forming system X according to the embodiment in the present disclosure, terminal 2a is further provided with specific information transmitting part 210 that transmits specific information 310, which is unique to the self-apparatus. Also, image forming apparatus 1a is further provided with specific information receiving part 110 that receives specific information 310 from terminal 2a. Then, password generating part 120 of image forming apparatus 1a generates password 320 as password 320 based on specific information 310. As configured in this way, reduction of the security by forgery of password, or the like, can be prevented, and it enables safer connection.

Also, as for image forming systems X according to the embodiment in the present disclosure, terminal 2a and image forming apparatus 1a further provide authentication parts 28 and 48, which perform biometric authentication, respectively. In this case, specific information 310 is biometric authentication information obtained by authentication part 28 in terminal 2a. Also, password generating part 120 of image forming apparatus 1a generates password 320 corresponding to biometric authentication information. Also, connection determining part 130 compares the biometric authentication information obtained by authentication part 48 in the self-apparatus with password 320 and determines whether password 320 is inputted or not. As configured in this way, it enables to make firm password 320 by using biometric authentication information. Also, because it becomes unnecessary to input password 320, convenience for a user improves.

Second Embodiment

Figure 8:
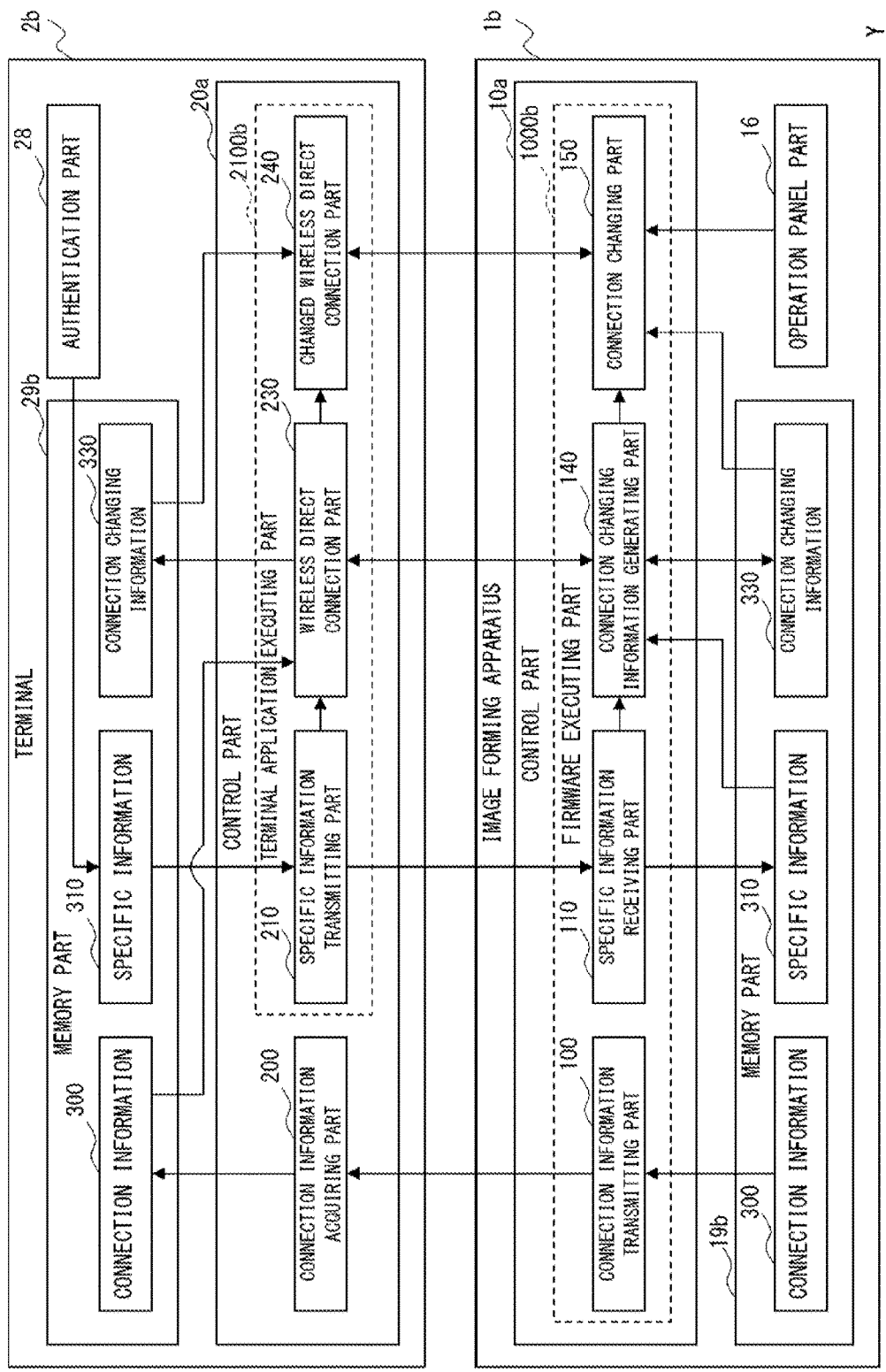
FIG. 8 is a block diagram showing the functional configuration of the image forming system according to a second embodiment of the present disclosure.
Figure 9:
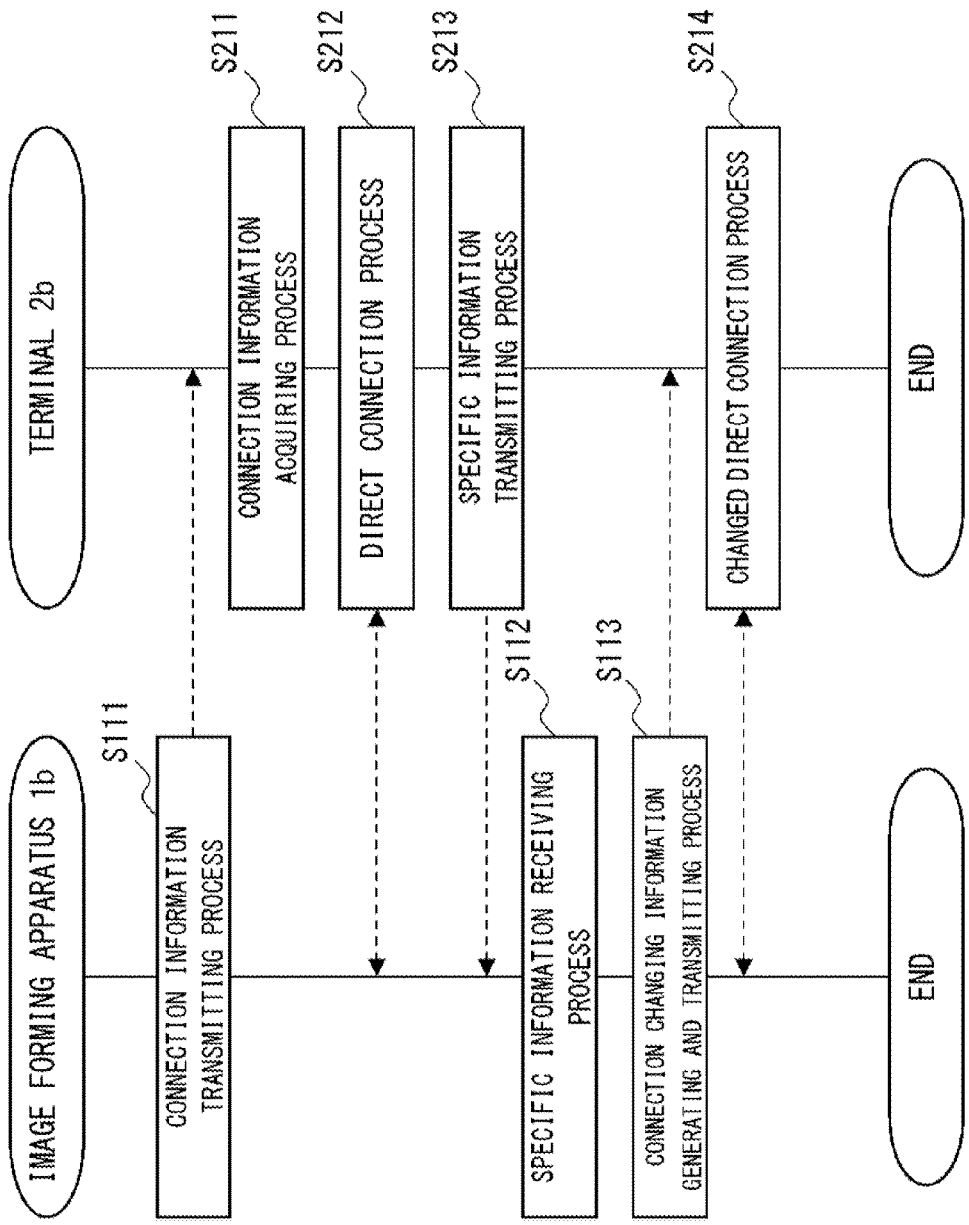
FIG. 9 is a flowchart of the connection establishment process according to the second embodiment of the present disclosure.

Then, as refer to FIG. 8-FIG. 9, image forming system Y according to the second embodiment of the present disclosure is explained. In the present embodiment, special firmware of image forming apparatus 1b is executed. Then, instead of the above-mentioned one-time password, the wireless direct connection with terminal 2b is performed again by using connection changing information 330, which changes SSID, an encrypted password, or the like, for wireless direct connection. Thereby, secure wireless direct connection becomes possible as like the above-mentioned first embodiment.

As refer to FIG. 8, a functional configuration of image forming system Y according to the second embodiment in the present disclosure is described. In addition, in FIG. 8, the same numerals are attached about the similar component as FIG. 4.

Also, control part 10b in image forming apparatus 1b includes connection information transmitting part 100, specific information receiving part 110, connection changing information generating part 140, and connection changing part 150. In the present embodiment, connection information transmitting part 100, specific information receiving part 110, connection changing information generating part 140, and connection changing part 150 are configured by firmware executing part 1000b that executes firmware stored in memory part 19b. Also, memory part 19b stores connection information 300, specific information 310, and connection changing information 330. Control part 20b in terminal 2 includes connection information acquiring part 200, specific information transmitting part 210, wireless direct connection part 230, and changed wireless direct connection part 240. In the present embodiment, specific information transmitting part 210, wireless direct connection part 230, and changed wireless direct connection part 240 are configured by terminal application executing part 2100b that executes the terminal application stored in memory part 29b. Also, connection information acquiring part 200 may be implemented as a function on OS as like the first embodiment. Also, memory part 29b stores connection information 300, specific information 310, and connection changing information 330.

Connection changing information generating part 140 generates connection changing information 330 and transmits it to terminal 2b. In this case, with terminal 2b, wireless direct connection is established by connection information 300 transmitted by connection information transmitting part 100 in image forming apparatus 1b. Also, connection changing information generating part 140 may generate connection changing information 330 based on specific information 310 obtained from terminal 2b and may transmit it. Also, connection changing information generating part 140 may generate connection changing information 330 corresponding to biometric authentication information and may transmit it.

Connection changing part 150 changes into connection changing information 330 transmitted by connection changing information generating part 140 and performs wireless direct connection with terminal 2b.

Changed wireless direct connection part 240, when wireless direct connection is established by wireless direct connection part 230, receives connection changing information 330, which is different from connection information 300, and performs wireless direct connection by using connection changing information 330.

Connection changing information 330 is information for the connection at the time of wireless direct connection being performed by changed wireless direct connection part 240. Connection changing information 330 may also be, for example, different SSID, an encrypted password, or the like, for WiFi-Direct, or the like, from connection information 300. Also, the encrypted password may be generated by connection changing information generating part 140.

Here, control part 10b in image forming apparatus 1b is functioned as connection information transmitting part 100, specific information receiving part 110, connection changing information generating part 140, and connection changing part 150 by executing the control program stored in memory part 19b. Also, control part 20b in terminal 2b is functioned as connection information acquiring part 200, specific information transmitting part 210, wireless direct connection part 230, and changed wireless direct connection part 240 by executing the control program stored by memory part 29b. Also, above-mentioned each part of image forming apparatus 1b and terminal 2b serve as hardware resources that execute the image forming method in the present disclosure.

[Connection Establishment Process by Image Forming System Y]

Then, as refer to FIG. 9, a connection establishment process by image forming system Y according to the second embodiment of the present disclosure is explained. In the connection establishment process of the present embodiment, between image forming apparatus 1b and terminal 2b, it connects by short-range wireless connection and receives connection information 300 for wireless direct connection. Then, by using acquired connection information 300, it performs wireless direct connection. Also, when wireless direct connection is established, connection changing information 330 that is different from connection information 300 is transmitted and received, changes into connection changing information 330, and performs wireless direct connection. In the connection establishment process of the present embodiment, mainly, control parts 10b and 20b collaborates with each part and executes programs stored in memory parts 19b and 20b, respectively by using hardware resources. In the following, a flow chart in FIG. 9 is referred to, details of the connection establishment process by image forming system Y according to the present embodiment are explained for each step.

(Steps S111, S211, S212, S213, and S112)

The processes are executed as like Steps S101, S201, S202, S203, and S102 in the first embodiment, respectively. By the processes, wireless direct connection is established between image forming apparatus 1b and terminal 2b.

(Step S113)

Then, connection changing information generating part 140 performs a connection changing information generating and transmitting process. Connection changing information generating part 140 generates connection changing information 330 and transmits it to terminal 2b. In this case, connection changing information generating part 140 may generate a random encrypted password as connection changing information 330 and may transmit it. Also, connection changing information generating part 140 may generate connection changing information 330 based on specific information 310 acquired from terminal 2b and may transmit it. Also, connection changing information generating part 140 may generate connection changing information 330 corresponding to biometric authentication information and may transmit it. In addition, the biometric authentication information may be obtained by authentication part 48 of image forming apparatus 1b or may be obtained by authentication part 28 of terminal 2b.

(Step S214)

Here, connection changing part 150 of terminal 2b performs a changed direct connection process. Changed wireless direct connection part 240 receives connection changing information 330 that is different from connection information 300 and stores it in memory part 29b. Then, connection changing part 150 changes SSID, the encrypted password, or the like, as corresponded to connection changing information 330 and performs wireless direct connection with terminal 2b. In this case, when connection changing information 330 corresponding to biometric authentication information is used, a connection change part may perform biometric authentication once again by authentication part 28 in terminal 2b and/or authentication part 48 in image forming apparatus 1b. As the above-mentioned, the connection establishment process according to the second embodiment in the present disclosure is ended. Then, terminal 2b and image forming apparatus 1b continue the wireless direct connection corresponding to connection changing information 330 while the wireless direct connection is not cut.

The following effects can be obtained with a configuration as mentioned above. Image forming system Y according to the embodiment of the present disclosure is an image forming system including terminal 2b and image forming apparatus 1b that can be printed from terminal 2b. Terminal 2b is provided with connection information acquiring part 200, wireless direct connection part 230, and changed wireless direct connection part 240. Connection information acquiring part 200 is connected with image forming apparatus 1b by short-range wireless connection and receives connection information 300 of wireless direct connection. Wireless direct connection part 230 performs wireless direct connection with image forming apparatus 1b by using connection information 300 acquired by connection information acquiring part 200. Changed wireless direct connection part 240, when wireless direct connection is established by wireless direct connection part 230, receives connection changing information 330 that is different from connection information 300 and performs wireless direct connection by using connection changing information 330. Image forming apparatus 1b is provided with connection information transmitting part 100, connection changing information generating part 140, and connection changing part 150. Connection information transmitting part 100 transmits connection information 300 to terminal 2b by short-range wireless connection. Connection changing information generating part 140 generates connection changing information 330 by connection information 300 transmitted by connection information transmitting part 100 and transmits it to terminal 2b in which wireless direct connection has been established. Connection changing part 150 changes into connection changing information 330 transmitted by connection changing information generating part 140 and performs wireless direct connection with terminal 2b. As configured in this way, image forming apparatus 1b can raise security at the time of connection with terminal 2b.

Also, as for image forming system Y according to the embodiment of the present disclosure, in terminal 2b, wireless direct connection part 230 and connection information acquiring part 200 are configured that an application software for self-apparatus is executed by terminal application executing part 2100b of the self-apparatus. Also, in image forming apparatus 1b, connection information transmitting part 100, connection changing information generating part 140, and connection changing part 150 are configured that firmware of a self-apparatus is executed by firmware executing part 1000b of the self-apparatus. As configured in this way and by preparing special firmware, hacking for image forming apparatus 1b installed in public places, such as a university, a co-op, and a convenience store, or the like, can be prevented, and security can be raised.

Also, as for image forming system Y according to the embodiment of the present disclosure, terminal 2b is further provided with specific information transmitting part 210 that transmits specific information 310 being unique to the self-apparatus. Also, image forming apparatus 1b is further provided with specific information receiving part 110 that receives specific information 310 from terminal 2b. Also, connection changing information generating part 140 generates connection changing information 330 based on specific information 310 and transmits it. As configured in this way, it becomes difficult to forge connection changing information 330, and it is raised in security.

Also, terminal 2b of image forming system Y related to the embodiment of the present disclosure has authentication part 28 that performs biometric authentication. Also, specific information 310 is biometric authentication information in authentication part 28 in terminal 2b. Also, as for image forming apparatus 1b connection changing information generating part 140 generates connection changing information 330 corresponding to biometric authentication information and transmits it. As configured in this way, by using biometric authentication information, firmer connection changing information 330 can be generated, and security is raised.

Other Embodiments

In addition, the present disclosure is applicable also to information processing apparatus other than an image forming apparatus. That is, it may be a configuration by using a server, or the like, connected a network scanner and a scanner separately connected by USB, or the like.

Also, about a part of functional configuration of the above-mentioned first embodiment and the second embodiment, or arbitrary combination, it may be configured by using an IC, a programmable logic, or the like, as hardware.

Also, the configuration and operation of the above-mentioned embodiment is an example, and it cannot be over-emphasized that it can change suitably and can operate in the range which does not deviate from the aim of the present disclosure.

What is claimed is:

1. An image forming apparatus comprising:
a connection information transmitting part configured to transmit connection information of wireless direct connection to a terminal by short-range wireless connection;
a password generating part configured to generate and transmit a password to the terminal in which the wireless direct connection has been established by the connection information transmitted by the connection information transmitting part;
a connection determining part configured to continue connection to the terminal when the password transmitted by the password generating part is inputted on the image forming apparatus, and disconnect connection to the terminal when the password is not inputted on the image forming apparatus; and
a specific information receiving part configured to receive specific information for the terminal, wherein said specific information is received from the terminal, and wherein the specific information comprises identification data unique to the terminal; wherein
the specific information is received from the terminal in an encrypted form and the image forming apparatus comprises a memory storing a secret key configured to decrypt the encrypted specific information; and
the password generating part generates the password as a password based on the specific information by converting the specific information into a character string using a hash function.

2. The image forming apparatus according to claim 1, wherein
the connection information transmitting part is configured by a control part that executes firmware of the image forming apparatus; and
the password generating part and the connection determining part are configured by the control part that executes application software additionally-installed other than the firmware.

3. The image forming apparatus according to claim 1, wherein the password generating part generates the password as a one-time password.

4. An image forming system having a terminal and an image forming apparatus configured to print jobs transmitted from the terminal, wherein:
the terminal includes
a connection information acquiring part configured to connect by short-range wireless connection with the image forming apparatuses and receive connection information of wireless direct connection,
a wireless direct connection part configured to perform the wireless direct connection with the image forming apparatus by the connection information acquired by the connection information acquiring part, and
a password acquiring part configured to receive and show a password when the wireless direct connection has been established by the wireless direct connection part;
the image forming apparatus includes a connection information transmitting part configured to transmit the connection information of the wireless direct connection to the terminal with the short-range wireless connection, a password generating part configured to generate and transmit a password to the terminal in which the wireless direct connection has been established by the connection information transmitted by the connection information transmitting part, and a connection determining part configured to continue connection with the terminal when the password transmitted by the password generating part is inputted on the image forming apparatus, and disconnect connection to the terminal when the password is not inputted on the image forming apparatus;

the terminal further comprises a specific information transmitting part configured to transmit specific information to the image forming apparatus in an encrypted form, the specific information comprises identification data unique to the terminal, the image forming apparatus further comprises a specific information receiving part configured to receive the specific information from the terminal, the image forming apparatus comprises a memory storing a secret key configured to decrypt the encrypted specific information, and the password generating part generates the password as a password based on the specific information by converting the specific information into a character string using a hash function.

5. The image forming system according to claim 4, wherein in the terminal, the wireless direct connection part and the password acquiring part are configured by a control part that executes an application software of the terminal; and in the image forming apparatus, the connection information transmitting part is configured by a control part that executes firmware of the image forming apparatus, and the password generating part and the connection determining part are configured to the control part that executes application software for the image forming apparatus additionally-installed other than the firmware of the image forming apparatus.

6. The image forming system according to claim 4, wherein the password generating part generates and transmits the password as a one-time password.

7. An image forming method executed by an image forming apparatus, comprising the steps of:

transmitting connection information of wireless direct connection to a terminal by short-range wireless connection;

generating and transmitting a password to the terminal in which the wireless direct connection has been established by transmitted connection information; and continuing connection to the terminal when the transmitted password is inputted on the image forming apparatus, disconnecting connection to the terminal when the password is not inputted on the image forming apparatus;

receiving specific information from the terminal in an encrypted form, wherein the specific information comprises identification data unique to the terminal;

storing a secret key for the encrypted specific information;

decrypting the encrypted specific information using the secret key; and generating and transmitting the password as a password based on the specific information by converting the specific information into a character string using a hash function.

8. The image forming method according to claim 7, comprising generating and transmitting the password as a one-time password.

* * * * *